United States Patent
Lary

[11] Patent Number: 6,135,692
[45] Date of Patent: *Oct. 24, 2000

[54] PRESS-FIT COTTER PIN

[76] Inventor: Banning Gray Lary, 6371 SW. 87th Ter., Miami, Fla. 33143

[*] Notice: This patent is subject to a terminal disclaimer.

[21] Appl. No.: 09/228,346

[22] Filed: Jan. 11, 1999

Related U.S. Application Data

[63] Continuation of application No. 08/845,932, Apr. 29, 1997, Pat. No. 5,857,819.

[51] Int. Cl.$^7$ .............................. F16B 21/18; A41F 1/00
[52] U.S. Cl. .............................. 411/530; 411/513; 24/625
[58] Field of Search .................................. 411/513, 514, 411/530, 508, 509; 24/296, 626, 625; 403/289, 329

[56] References Cited

U.S. PATENT DOCUMENTS

| Re. 19,452 | 2/1935 | Peterson . |
| 73,735 | 1/1868 | Magrane ................................. 411/530 |
| 362,548 | 5/1887 | Smith . |
| 707,756 | 8/1902 | Brown . |
| 874,957 | 12/1907 | Godley . |
| 919,925 | 4/1909 | McWhorter . |
| 1,232,527 | 7/1917 | Gemmill ................................. 411/530 |
| 1,237,515 | 8/1917 | Hermann . |
| 1,992,093 | 2/1935 | Place . |
| 2,109,576 | 3/1938 | Place . |
| 2,169,708 | 8/1939 | O'Callaghan . |
| 2,401,976 | 6/1946 | Simpson . |
| 3,633,390 | 1/1972 | Wartian . |
| 4,037,513 | 7/1977 | Hobson . |
| 4,086,014 | 4/1978 | Jalaguier . |
| 4,543,024 | 9/1985 | Hackney . |
| 4,553,891 | 11/1985 | Aubrun . |
| 4,592,689 | 6/1986 | Leitzke . |
| 4,923,350 | 5/1990 | Hinksman et al. . |
| 5,004,390 | 4/1991 | Cumbie . |
| 5,152,652 | 10/1992 | Nadherny . |
| 5,217,338 | 6/1993 | Czubek . |
| 5,458,449 | 10/1995 | Mikaila . |

FOREIGN PATENT DOCUMENTS

| 1104981 | 11/1955 | France . |
| 1291563 | 3/1969 | Germany ................................. 411/530 |
| 3908000 | 9/1990 | Germany . |
| 7827 | 4/1896 | United Kingdom . |

*Primary Examiner*—Flemming Saether
*Attorney, Agent, or Firm*—Nydegger & Associates

[57] ABSTRACT

A cotter pin which is engageable with a fastening member is formed from a wire and includes a bight with a pair of legs that extend therefrom. Specifically, the bight is formed with shoulders that will substantially conform with a surface of the fastening member. Also, each end of the legs of the cotter pin is formed with a retainer member which has an abutment that will substantially conform with another surface of the fastening member. More specifically, one surface is at one end of an aperture which passes through the fastening member, and the other surface is at the other end of the aperture. Each retainer member is formed with a point at the end of its respective leg, and these points are spaced from each other by a distance which is less than the diameter of the aperture that is formed through the fastening member. For engagement of the cotter pin with the fastening member, the points of the retainer members are positioned at an opening of the aperture. The retainer members of the cotter pin are then simultaneously inserted through the aperture. This positions the shoulder of the bight against one surface of the fastening member and the abutments of the retainer members against another surface of the fastening member.

18 Claims, 2 Drawing Sheets

PRESS-FIT COTTER PIN

CROSS REFERENCE TO RELATED APPLICATION

This application is a continuation of application Ser. No. 08/845,932 filed on Apr. 29, 1997, now U.S. Pat. No. 5,857,819 entitled "Press-Fit Cotter Pin", the contents of which are incorporated herein by reference.

FIELD OF THE INVENTION

The present invention pertains generally to cotter pins. More particularly, the present invention pertains to cotter pins which establish a stable and effective bulwark for holding one member, such as a washer, on another member, such as a post or a pin. The present invention is particularly, but not exclusively useful as a cotter pin which can be engaged with a fastening member in a one-step press-fit operation.

BACKGROUND OF THE INVENTION

The use of cotters or cotter pins for the purposes of holding, retaining or positioning one body (e.g. a washer) relative to another body (e.g. a post) has been widely practiced for some time. Exemplary of early devices which were designed and intended for use as cotter pins is U.S. Pat. No. 362,548 which was issued to Oberlin Smith on May 10, 1867, for an invention entitled "Spring-Key". Another example of an early cotter pin type device is provided by U.S. Pat. No. 2,410,976 which issued to Simpson on Jun. 11, 1946 for an invention entitled "Securing Pin". Both of these examples are typical of the types of cotter pins which rely on an inherent ability of the cotter pin to reconfigure itself for complete engagement of the pin with a fastening member. They are also typical of cotter pins which are not configured to snugly engage with a fastening member, and to thereby a stable bulwark on the fastening member.

In many applications it is desirable that a cotter pin provide a stable bulwark on a fastening member against which a structure, such as a washer, can be positioned and held stationary. To accomplish this, however, it is necessary for the bight of the cotter pin to be specifically designed for its cooperation with the surface of the fastening member. Specifically, a sufficient portion of the bight needs to be positioned in contact with the surface of the fastening member in order to more evenly distribute the forces which may be generated therebetween. Further, it is necessary for the distal ends of the cotter pin legs (i.e. the end of the cotter pin which is opposite the bight) to be similarly designed. Still further, it is very preferable that the length of the cotter pin be established so that upon engagement of the cotter pin with a fastening member, longitudinal back-and-forth movement of the cotter pin relative to the fastening member will be either eliminated or minimized.

In addition to the dimensional considerations mentioned above, it is also of practical importance that the cotter pin be easily engaged with and disengaged from the particular fastening member with which it cooperates. The easiest method for engagement, of course, would be a one-step operation wherein the cotter pin is simply press-fit into the fastening member. Likewise, the easiest method for disengagement would be effectively a one-step operation.

In light of the above, it is an object of the present invention to provide a press-fit cotter pin which can be snugly engaged with a fastening member to establish a stable bulwark for holding a third body on the fastening member. It is another object of the present invention to provide a press-fit cotter pin which can be engaged with a fastening member in a one-step operation. It is yet another object of the present invention to provide a press-fit cotter pin which can be easily disengaged from a fastening member. Still another object of the present invention is to provide a press-fit cotter pin which is relatively easy to manufacture, simple to operation and comparatively cost effective.

SUMMARY OF THE PREFERRED EMBODIMENTS

A cotter pin which is engageable with a fastening member includes a pair of straight flexible legs which extend generally parallel to each other from a bight. Further, each leg has a retainer member formed at the leg end opposite the bight. As intended for the present invention, in order to engage the cotter pin with the fastening member, the legs and retainer members of the cotter pin are inserted into an aperture that is formed through the fastening member. As a result of this insertion, the legs of the cotter pin are located inside the aperture with the bight positioned outside the aperture and against a surface of the fastening member. Also, the pair of retainer members are passed completely through the aperture and are positioned against the surface on the other side of the fastening member. As intended for the present invention, the engagement of the cotter pin with the fastening member is accomplished in a single, one-step, press-fit operation. The particular structure of the cotter pin makes this possible.

The bight for the cotter pin of the present invention is formed with a shoulder portion. More specifically, the shoulder portion includes two overlapping sections and is configured to substantially conform with the surface of the fastening member against which it is to be positioned. The legs of the cotter pin respectively extend from each of the overlapping sections, and are positioned generally parallel to each other. This particular configuration allows the bight to provide a spring-like action for the relative movement of the legs.

At their respective ends, opposite the bight, each leg of the cotter pin is formed with a retainer member. Specifically, each retainer member is formed with a distal point and each has an angled portion which extends proximally from the distal point. This angled portion of the retainer member is inclined outwardly from the leg and terminates at an abutment which extends from the angled portion back toward the leg of the cotter pin. Like the bight, each abutment is configured to substantially conform with the surface of the fastening member against which it is to be positioned.

Dimensions for various elements of the cotter pin are very important for its proper operation. With this in mind, consider first the length of each leg between the bight and the respective retainer member. Preferably, this length is the same or slightly longer than the distance at which the aperture extends through the fastening member. Also, it is important that the distance between the two distal points of the respective retainer members be less than the diameter of the aperture. Further, it is preferable for the perpendicular distance between the legs to be equal to, or less than, the diameter of the aperture. On the other hand, it is important that both the shoulder portion of the bight, and the abutments of the retainer members, extend outwardly from the aperture to a distance than is greater than the diameter of the aperture.

In the operation of the press-fit cotter pin of the present invention, the distal points on the retainer members of the coffer pin are positioned with both distal points slightly inserted into the aperture of the fastening member. This partial insertion causes the angled portions of the respective retainer members to rest against the periphery of the aperture. The bight of the cotter pin is then pushed to insert the pin into the aperture. With this push the reactive force exerted by the fastening member against the angled portions of the retainer members causes the retainer members to assume a juxtaposed configuration. In this juxtaposed configuration, the retainer members are insertable through the aperture. The legs follow.

In another embodiment of the cotter pin of the present invention, the retainer members include both an angled portion and a flared portion. Specifically, the respective angled portions and flared portions of the retainer members establish the point substantially under the midpoint of the respective abutment. With this configuration, when the retainer members are juxtaposed, the points are also juxtaposed to facilitate insertion of the retainer member through the aperture.

Once the retainer members have passed through the aperture, they emerge from the aperture on the opposite side of the fastening member. Then, due to the resilience of the legs and the spring action of the bight, the retainer members extend outwardly from their juxtaposed configuration to position the abutments of the retainer members against the surface of the fastening member. At the same time, the bight comes into contact with the fastening member to position its shoulder portion against the surface of the fastening member. Thus, engagement of the press-fit coffer pin with the fastening member is complete. Disengagement of the press-fit cotter pin from the fastening member is simply accomplished by applying equal and substantially opposite forces against the retainer members to reposition the retainer members in their juxtaposed configuration. With the retainer members in this juxtaposed configuration, the press-fit cotter pin is withdrawn through the aperture to separate the cotter pin from the fastening member.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION

Figure 1:
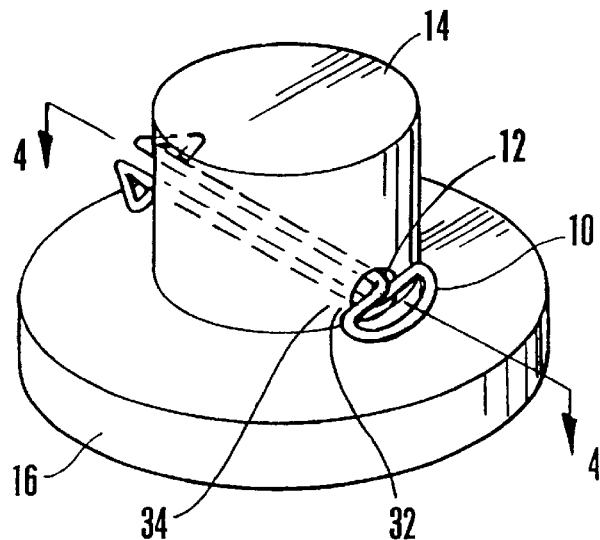
FIG. 1 is a perspective view of a press-fit cotter pin of the present invention engaged a fastening member.

Referring initially to FIG. 1, a press-fit cotter pin is shown and designated 10. Specifically, as seen in FIG. 1, the cotter pin 10 has been inserted into and through an aperture 12 that is formed in a fastening member. The purpose for engaging the cotter pin 10 with the fastening member 14, as illustrated in FIG. 1, is to hold or maintain a washer 16 in a desired position relative to the fastening member 14. It will be appreciated by the skilled artisan that there are numerous purposes which can be accomplished by the engagement of a cotter pin 10 with a fastening member 14. Indeed, the purposes are too numerous to be listed here.

Figure 2:
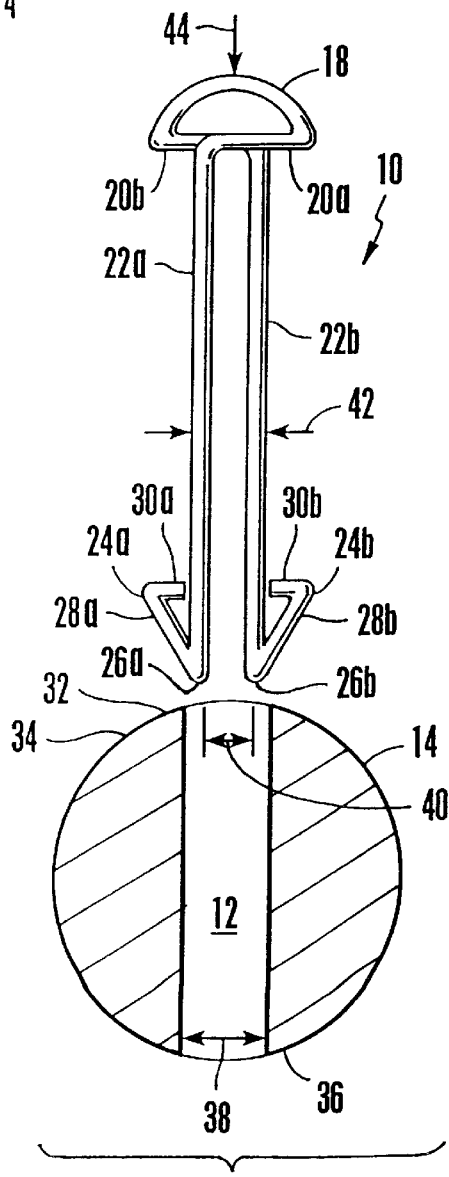
FIG. 2 is a cross sectional view of the fastening member with the press-fit cotter pin poised for insertion into an aperture formed in the fastening member

The specific details of the press-fit cotter pin 10 will, perhaps, be best appreciated by reference to FIG. 2. There it will be seen that the cotter pin 10 is formed from an integral wire. For purposes of the present invention, the wire that is to be used for the cotter pin 10 can be made of any material which has sufficient strength and flexibility to perform the functions required for operation of the cotter pin 10. For example, the cotter pin 10 can be made of either a metal or a plastic material. In any event, it is Important that the wire be formed substantially as shown in FIG. 2.

In FIG. 2 it can be seen that the cotter pin 10 is formed with a bight 18. For purposes of disclosure here, the bight 18 will be sometimes be referred to as being at the proximal end of the cotter pin 10. As can be easily appreciated, the bight 18 is formed at the center of the wire that is used for the manufacture of the cotter pin 10. The upper portion of the bight 10 is substantially semi circular in it shape and the lower, more distal portion of the bight 10 is formed as a pair of overlapping shoulders 20*a* and 20*b*. It is to be noted that the shoulders 20*a* and 20*b* can be either straight (as shown) or slightly curved. In either case the shoulders 20*a* and 20*b* overlap each other such that, as shown in FIG. 2, the shoulder 20*b* is seen to be behind the shoulder 20*a*.

Figure 3:
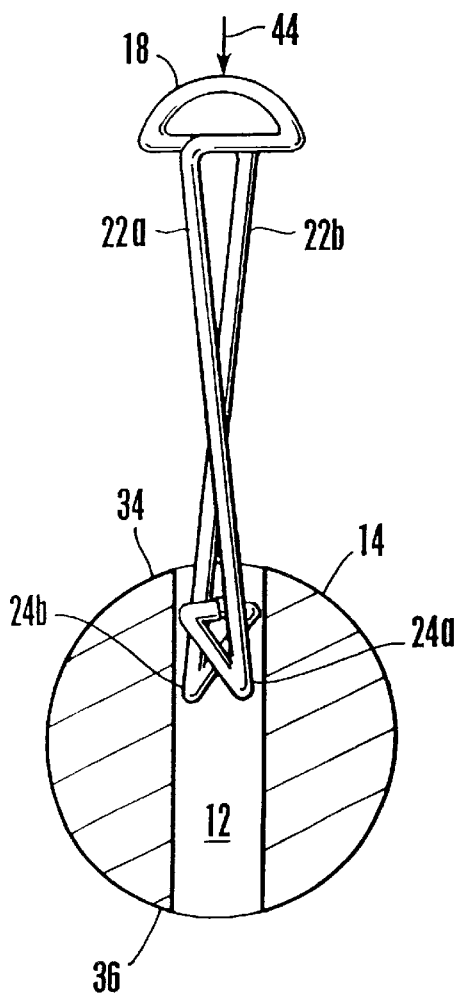
FIG. 3 is a cross section view of the fastening member as seen in FIG. 2 with the press-fit cotter pin partially inserted into the aperture.

Extending respectively from the shoulders 20*a* and 20*b* are a pair of legs 22*a* and 22*b*. As shown, the legs 22 are straight and are substantially parallel to each other whenever the cotter pin 10 is in a relaxed of unstressed state. At the distal end of the cotter pin 10, each of the legs 22*a* and 22*b* is formed with a respective retainer member 24*a* and 24*b*. It is important to note that there will be some inherent resilience in the legs 22*a* and 22*b*. As will be better appreciated by subsequent disclosure, it is desirable that the legs 22*a* and 22*b* be able to move relative to each other. Indeed, it is intended that the legs 22*a* and 22*b* cross over each other, as shown in FIG. 3. It is equally important, however, that the legs 22*a* and 22*b* be able to return to the relaxed, unstressed configuration shown in FIG. 2. This ability to return to the unstressed relaxed configuration is facilitated by the resilience of the legs 22*a* and 22*b*. Further, the structure of the bight 18 assists in this reconfiguration. Specifically, due in significant part to the cross over construction of the shoulders 18*a* and 18*b*, the bight 18 acts as a spring which is biased to return the legs 22*a* and 22*b* to their relaxed or unstressed configuration shown in FIG. 2.

Each of the retainer members 24*a* and 24*b* begins with a distal point 26*a* and 26*b* which is located at the distal end of a respective leg 22*a* and 22*b*. Extending generally in a proximal direction from the distal points 26*a* and 26*b* are angled portions 28*a* and 28*b*. Each of these angled portions 28*a* and 28*b* are inclined relative to their respective legs 22*a* and 22*b*. The exact angle of incline for each of these angled portions 25*a* and 25*b* is somewhat a matter of choice but is, preferably, in a range of from about 20° to approximately 50°. The retainer members 24*a* and 24*b* also include a respective abutment 30*a* and 30*b*. As shown in FIG. 2, these abutments 30*a* and 30*b* are oriented substantially perpendicular to their respective legs 22*a* and 22*b* and extend inwardly from the angled portion 28*a,b* toward the leg 22a,b. Similar to the shoulders 20a,b, of bight 18, the abutments 30a,b are either straight, as shown, or they can be slightly curved.

As indicated above, the intent of the present invention is to provide a press-fit cotter pin 10 which is engageable with a fastening member 14. Various types of fastening members 14 can, of course, be used with the cotter pin 10 of the present invention. It is contemplated, however, that a typical fastening member 14 will be a generally cylindrical post substantially as shown in the Figures. Regardless of outward appearances, all fastening members 14 will require some sort of aperture 12. For purposes of disclosure, it is considered that the aperture 12 is substantially cylindrical in shape, and that the aperture 12 extends completely through the fastening member 14 as shown in all of the Figures. As also shown, and best seen in FIG. 1, the aperture 12 has a generally circular periphery 32 that is established on the surface 34 of fastening member 14 at the opening of the aperture 12. The surface 34 of fastening member 14 is distinguished from the surface 36 of fastening member 14 to the extent they are proximate or near different openings at opposite ends of the aperture 12.

Relative dimensions between the cotter pin 10 and the fastening member 14 are important for several reasons. Specifically, it is necessary for the cotter pin 10 to interact with the fastening member 14 in a predictable manner in order for the press-fit operation of the cotter pin 10 to be effective. The dimensions which are particularly crucial for this operation include the diameter 38 of aperture 12, the distance 40 between the distal points 26a and 26b of the cotter pin 10, and the width 42 across the cotter pin 10 from leg 22a to leg 22b. As illustrated in FIG. 2, the width 42 across the cotter pin 10 is measured from the outer surface of the legs 22. Additionally, in the embodiment illustrated in FIG. 2, each of the distal points 26a, 26b, is positioned proximate to the center of one of the legs 27a, 27b. Importantly, the exact values for these dimensions is unimportant. What matters is their relative values. Specifically, the distance 40 between the distal points 26a and 26 be should be less than the diameter 38 of aperture 12. Further, the width 42 across the cotter pin 10 from leg 22a to leg 22b should be about the same or slightly less than the diameter 38 of aperture 12.

Figure 5:
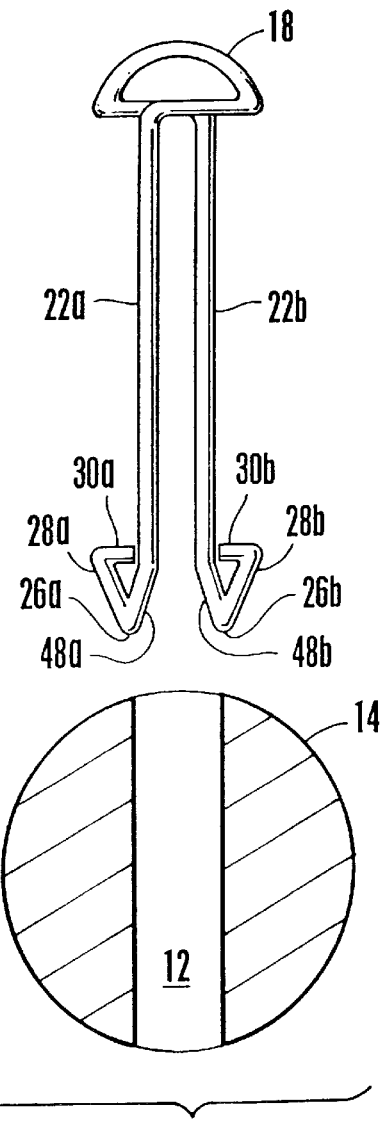
FIG. 5 is a cross sectional view of the fastening member as seen along the line 2—2 in FIG. 1 with an alternate embodiment of the press-fit cotter pin poised for insertion into the aperture formed in the fastening member.
Figure 6:
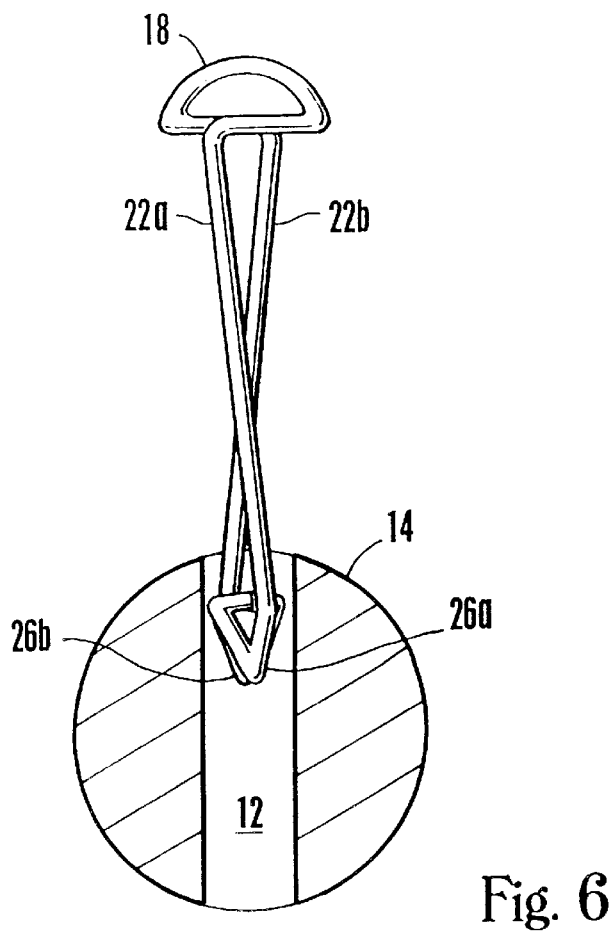
FIG. 6 is a cross section view of the fastening member as seen in FIG. 2 with the alternate embodiment of the press-fit cotter pin partially inserted into the aperture.

For the alternate embodiment of the cotter pin 10 shown in FIGS. 5 and 6, it will be seen that each of the retainer members 28a and 28b includes a respective flared portion 48a, 48b. As shown, these flared portions 48a, 48b cooperate with each other to position the respective points 26a, 26b under the midpoint of the respective abutment 30a, 30b. Further, when the retainer members 28a, 28b are juxtaposed during their insertion through aperture 12, the points 26a, 26b will also be juxtaposed. This juxtaposition facilitates insertion of the cotter pin 10 into fastening member 14.

OPERATION

In the operation of the press-fit cotter pin 10 of the present invention, the cotter pin 10 is first poised over the aperture 12 of fastening member 14 substantially as shown in FIG. 2. The cotter pin 10 is then advanced into contact with the fastening member 14. Because the distance 40 between distal points 26a and 26b is less than the diameter 38 of aperture 12, this advancement will bring the angled portion 28a,b of retainer members 24a,b into contact with the periphery 32 of aperture 12. Then, the application of a force against bight 18 in the direction indicated by arrow 44 in FIGS. 2 and 3 will advance the cotter pin 10 into aperture 12. Specifically, the reactive force of the fastening member 14 in response to insertion of the cotter pin 10 into aperture 12 will manifest itself as a forces against the angled portions 28a,b of the retainer members 24a,b. These reactive forces will then drive the retainer members 24a,b into a juxtaposed configuration shown in FIG. 3. Note that because the shoulders 20a,b of bight 18 are overlapped, it is now possible for the legs 22a,b to do likewise. With the retainer members 24a,b in this juxtaposed configuration, the cotter pin 10 can be further advanced through the aperture 12 for engagement of the cotter pin 10 with the fastening member 14.

Figure 4:
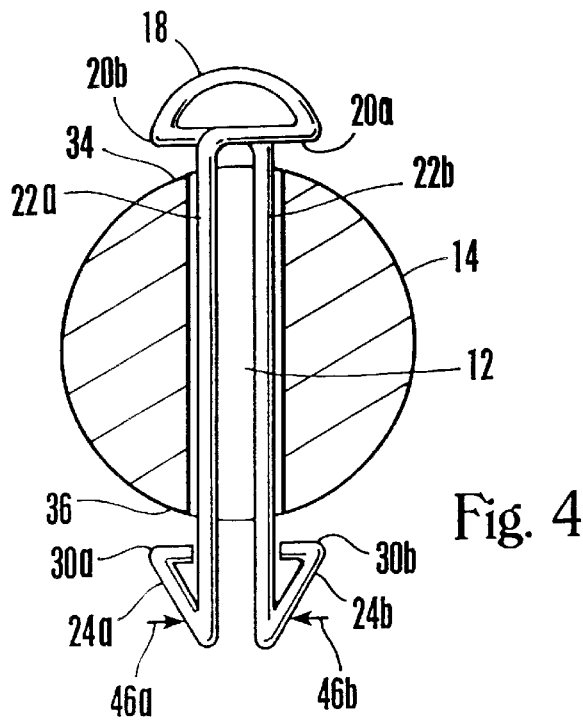
FIG. 4 is a cross section view taken on line 4—4 of FIG. 1.

Once the retainer members 24a,b have completely passed through the aperture 12, the cotter pin 10 will then assume a configuration (shown in FIG. 4) that is similar to its prior relaxed and unstressed configuration (shown in FIG. 2). Further, as shown in FIG. 4, the insertion of cotter pin 10 through aperture 12 positions the shoulders 20a,b against the surface 34 of fastening member 14 and the abutments 30a,b against the surface 36 of fastening member 14. As will be readily appreciated, it is possible to dimension the cotter pin 10 so that the distance between shoulders 20a,b and abutments 30a,b is substantially the same as the length of aperture 12 through the fastening member 14. In this case both the shoulders 20a,b and the abutments 30a,b will be seated against the respective surfaces 34 and 36. This gives a very snug fit and effectively prevents or minimizes any longitudinal back-and-forth motion of the cotter pin 10 in the aperture 12. Further, this snug fit insures that the cotter pin 10 will act as an effective and stable bulwark for washer 16. While it is contended that even straight shoulders 20a,b and straight abutments 30a,b will substantially conform with the respective surfaces 34 and 36 of fastening member 14, it is to be understood that the shoulders 20a,b and abutments 30a,b can be angles slightly or even curved slightly to ensure additional conformance. In any event, both the shoulders 20a,b and the abutments 30a,b will contribute significantly to the stability and effectiveness of the interaction between the press-fit cotter pin 10 and the fastening member 14.

To disengage the cotter pin 10 from the fastening member 14, the user simply applies substantially equal and opposite forces on the retainer members 24a,b as indicated by the arrows 46a and 46b in FIG. 4. The application of these forces 46a,b will cause the retainer members 24a,b to assume the juxtaposed configuration shown in FIG. 3. With the retainer members 24a,b in this juxtaposed configuration, the cotter pin 10 can be withdrawn through the aperture and separated from the fastening member 14.

While the particular cotter-pin 10 as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. A cotter pin comprising:
 a bight, said bight including an upper portion having a pair of opposed ends and a pair of overlapping shoulders, said shoulders having a thickness, t, each shoulder extending from a different one of the opposed ends, said shoulders lying substantially in a single plane of thickness t;
 a first leg and a second leg, each leg extending from a different one of said shoulders; and
 two retainer members, a first retainer member and a second retainer member, said first retainer member extending from said first leg in a direction substantially away from said second leg.

2. The cotter pin of claim 1 wherein the legs are substantially straight.

3. The cotter pin of claim 2 wherein the legs are biased to extend substantially parallel.

4. The cotter pin of claim 1 wherein each retainer member is formed with an abutment.

5. The cotter pin of claim 4 wherein said opposed ends are distanced from each other by an end separation distance, and wherein each retainer member includes a distal point and the distal points of the retainer members are spaced from each other a distance which is less than said end separation distance.

6. The cotter pin of claim 5 wherein each retainer member includes an angled portion and a flared portion between the distal point and the abutment and each distal point is positioned under a midpoint of the abutments.

7. A combination including the cotter pin of claim 1 and a fastening member having a first surface, a second surface and an aperture extending between the first surface and the second surface.

8. The combination of claim 7 wherein the legs of the cotter pin are positioned substantially against the fastening member when the cotter pin is inserted into the aperture.

9. A cotter pin comprising:
a first leg having a first end and a second end, the first leg being substantially straight;
a second leg having a first end and a second end, the second leg being substantially straight;
a bight having a shoulder portion including a pair of opposed ends and a pair of overlapping, adjacent shoulders, each shoulder extending from a different one of the opposed ends; wherein each leg extends from a different one of the shoulders; wherein the bight biases the legs in a substantially parallel configuration; and
two spaced apart retainer members, a first retainer member and a second retainer member, said first retainer member extending from said first leg in a direction substantially away from said second leg, and said second retainer member extending from said second leg in a direction substantially away from said first leg.

10. The cotter pin of claim 9 wherein each retainer member is formed with an abutment.

11. The cotter pin of claim 10 wherein said opposed ends are distanced from each other by an end separation distance, and wherein each retainer member includes a distal point and the distal points of the retainer members are spaced from each other a distance which is less than said end separation distance.

12. The cotter pin of claim 11 wherein each retainer member includes an angled portion and a flared portion between the distal point and the abutment and each distal point is positioned under a midpoint of one of the abutments.

13. A combination including the cotter pin of claim 9 and a fastening member having a first surface, a second surface and an aperture extending between the first surface and the second surface.

14. The combination of claim 13 wherein the legs of the cotter pin are positioned substantially against the fastening member when the cotter pin is inserted into the aperture.

15. A method for engaging a cotter pin with a fastening member, the fastening member having a first surface, a second surface and an aperture extending between the first surface and the second surface, the method comprising the steps of:
providing a cotter pin including (i) a bight including an upper portion having a pair of opposed ends and a pair of overlapping shoulders, said shoulders having a thickness, t, each shoulder extending from a different one of the opposed ends, said shoulders lying substantially in a single plane of thickness t; (ii) a pair of legs, each leg extending from a different one of said shoulders; and (iii) a pair of retainer members, each retainer member being secured to a different one of the legs;
inserting at least a portion of the retainer members into the aperture; and
pushing the cotter pin into the aperture to position the shoulders substantially against the first surface.

16. The method of claim 15 wherein the step of providing a cotter pin includes providing legs which are substantially straight and biased to extend substantially parallel.

17. The method of claim 15 wherein the step of providing a cotter pin includes forming each retainer member with an abutment configured to substantially conform with the second surface of the fastening member to retain the cotter pin in the fastening member.

18. The method of claim 15 wherein the step of providing a cotter pin includes forming each retainer member to include a distal point and the distal points of the retainer members are spaced from each other a distance which is less than a diameter of the aperture to facilitate insertion of the retainer members through the aperture.

* * * * *